Patented July 9, 1935

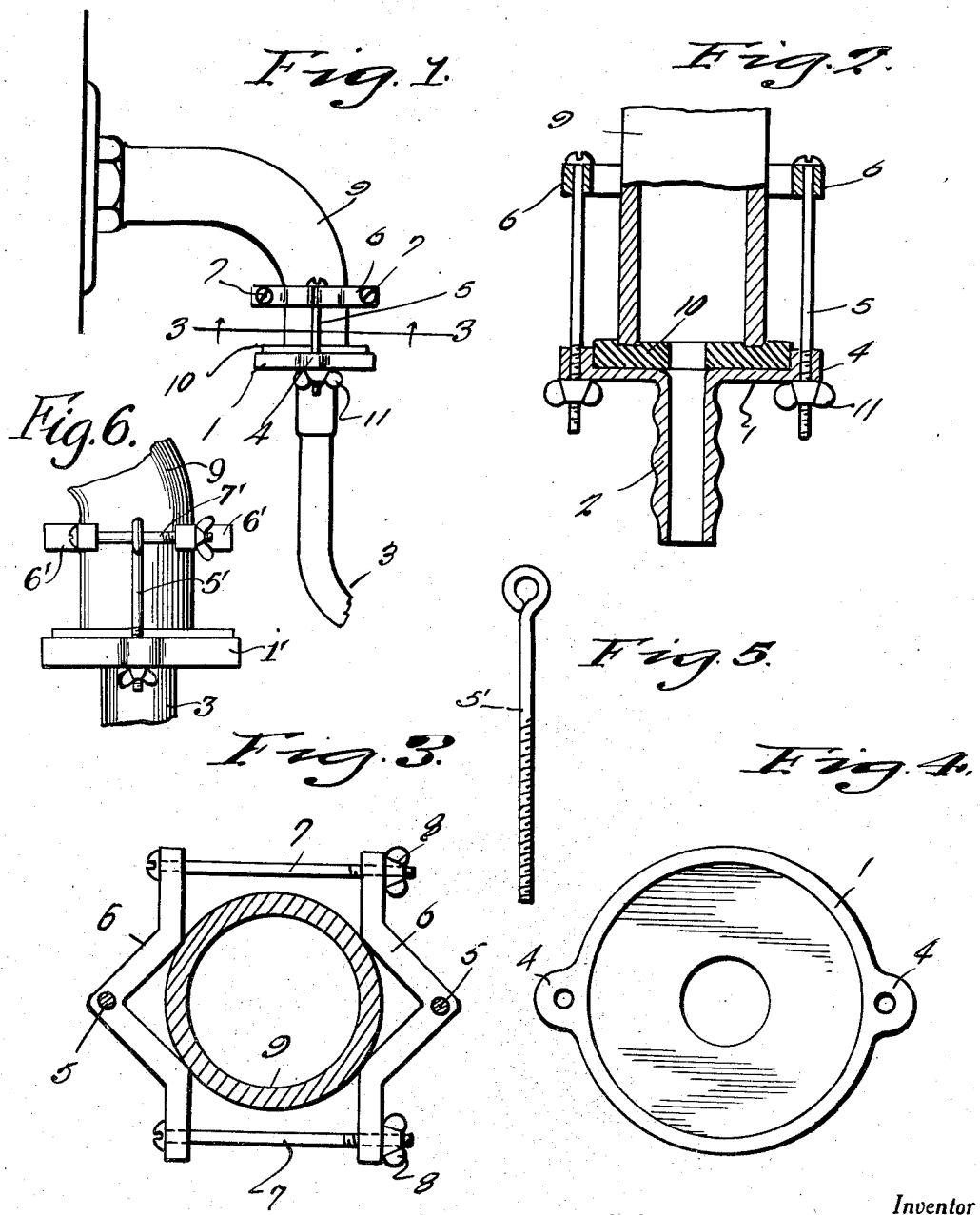

2,007,331

UNITED STATES PATENT OFFICE 2,007,331

COUPLING FOR CONNECTING A HOSE TO A FAUCET

Maurice H. Hollingsworth, Miami Beach, Fla.

Application March 13, 1934, Serial No. 715,368

3 Claims. (Cl. 285—198)

This invention relates to a coupling for connecting a hose to a faucet, the general object of the invention being to provide means whereby the coupling can be attached to different types of and sizes of faucets.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a view showing the invention in use for attaching a hose to a faucet.

Figure 2 is a front view, with parts in section, showing the invention applied to a faucet.

Figure 3 is a section on line 3—3 of Figure 1.

Figure 4 is a top plan view of the nipple carrying plate.

Figure 5 is a view of an eye bolt, two of which are used to connect the bolts 7 with the cup-shaped plate.

Figure 6 is an elevation showing how the eye-bolt shown in Fig. 5 engages a clamp bolt and the cup-shaped plate.

In this drawing, the numeral 1 indicates a substantially cup-shaped plate having a nipple 2 depending from its central portion, this nipple being exteriorly grooved for receiving one end of a hose 3. A pair of diametrically arranged ears 4 extend from the side parts of the cup-shaped plate and are perforated to receive the lower threaded ends of the bolts or screws 5.

A pair of jaw members is shown at 6 and each jaw member has its central portion forming an outwardly extending V and the apex of each V-shaped part is perforated to receive the head end of a screw, as shown more particularly in Figure 2. Each end of each jaw member is perforated so that the screws or bolts 7 can be passed through said perforations to connect the two jaw members together and the wing nuts 8 threaded on the screws, when tightened, will cause the two jaw members to clamp upon the lower part of a faucet 9, as shown in Figures 1 and 3.

A gasket or washer 10 is seated in the cup-shaped member 1 for engaging the lower end of the faucet to provide a water-tight joint, but if desired, the cup-shaped member can be made of relatively soft metal so that when the bottom of the cup-shaped part is pressed against the bottom of the faucet, a water-tight joint will be produced.

Thus it will be seen that it is simply necessary to place the two jaw members 6 against a part of the faucet and then tighten the nuts 8 so as to cause the jaw members to clamp upon the faucet and then by tightening the thumb nuts 11 on the screws 5, the cup-shaped member will be forced upwardly toward the faucet so as to cause the gasket to make a water-tight joint with the lower end of the faucet, as shown in Figure 2.

The cup-shaped member should be of such a size as to be used with the largest size of faucets and the opening in the cup-shaped member and gasket, if the gasket is used, should be of such a size as to be used with the smallest size of faucet. This will enable the device to be used with any size and type or shape of faucet, as the construction of the jaw members and the cup-shaped member will enable the invention to be readily attached to any size of faucet and any type of faucet.

Figure 6 shows an arrangement whereby the bolts which support the cup-shaped member 1' engage the clamp bolts 7' instead of passing through holes in the jaws 6' of the clamp. As shown in Figures 5 and 6, these bolts 5', which pass through holes in the cup-shaped member 1', have eyes at their upper ends through which the bolts 7' pass. In this case, the cup-shaped plate 1' is moved a quarter turn from the position shown in Figs. 1 and 2 so that the eyes of the bolts 5' will receive the bolts 7'.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A coupling for attaching a hose to a faucet, comprising a plate having a nipple depending therefrom for receiving one end of a hose, a pair of jaw members, each having an outwardly extending V-shaped central part, bolts connecting the jaw members together and having nuts thereon for clamping the jaw members to the faucet, and bolts connecting the jaw members to the plate and having nuts thereon, said bolts and nuts acting to move the plate toward and away from the lower end of the faucet without rotating the plate.

2. A coupling for attaching a hose to a faucet comprising a plate having a nipple depending therefrom for receiving one end of a hose, a clamping device for engaging part of a faucet, and adjustable means for connecting the clamping device to the plate for holding the plate with a part thereof engaging the end of the faucet, such means when adjusted non-rotatably moving the plate toward and away from the lower end of the faucet.

3. A coupling for attaching a hose to a faucet comprising a plate having a nipple depending therefrom for receiving one end of a hose, a pair of jaw members, bolts and nuts connecting the jaw members together in clamping engagement about a part of a faucet, eye bolts having their eyes receiving the first mentioned bolts, said eye bolts passing through parts of the plate and nuts on the lower ends of the eye bolts.

MAURICE H. HOLLINGSWORTH.